(12) United States Patent
Bookbinder et al.

(10) Patent No.: US 8,815,103 B2
(45) Date of Patent: Aug. 26, 2014

(54) PROCESS FOR PREPARING AN OPTICAL PREFORM

(75) Inventors: Dana Craig Bookbinder, Corning, NY (US); Nicolas LeBlond, Painted Post, NY (US); Judith Eileen Young, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 988 days.

(21) Appl. No.: 12/273,642

(22) Filed: Nov. 19, 2008

(65) Prior Publication Data

US 2009/0272716 A1 Nov. 5, 2009

Related U.S. Application Data

(60) Provisional application No. 61/125,984, filed on Apr. 30, 2008.

(51) Int. Cl.
*B29D 11/00* (2006.01)

(52) U.S. Cl.
USPC .......................................... 216/24

(58) Field of Classification Search
USPC .......................................... 216/24
See application file for complete search history.

(56) References Cited

U.S. PATENT DOCUMENTS

| | | |
|---|---|---|
| 6,253,580 B1 | 7/2001 | Gouskov et al. |
| 2002/0134113 A1 | 9/2002 | Berkey .............................. 65/397 |
| 2003/0150242 A1* | 8/2003 | Caplen et al. .................... 65/428 |
| 2008/0028799 A1* | 2/2008 | Kwon et al. ...................... 65/417 |
| 2008/0107385 A1* | 5/2008 | Ohga et al. ...................... 385/123 |

FOREIGN PATENT DOCUMENTS

| | | | |
|---|---|---|---|
| JP | 60086047 A * | 5/1985 | ............ C03B 37/018 |
| WO | 00/64825 | 11/2000 | ............ C03B 37/014 |
| WO | 02/36510 | 5/2002 | ............ C03B 37/014 |
| WO | WO 2004101456 | * 11/2004 | ............ C03B 37/27 |

OTHER PUBLICATIONS

Jansen et al. (J. Micromech. Microeng. 6 (1996), pp. 14-28).*
Nov. 1, 2009 CN Search Report of counterpart CN application No. 200980124803.5.

* cited by examiner

*Primary Examiner* — Nadine Norton
*Assistant Examiner* — Mahmoud Dahimene
(74) *Attorney, Agent, or Firm* — Svetlana Short

(57) ABSTRACT

A method of preparing an optical preform includes the steps of: a) etching an optical preform to remove a portion of an oxide material deposited on the preform by using a gas comprising an etchant gas containing fluorine at a sufficient temperature and gas concentration to create a redeposited germanium containing compounds contamination such as $GeO_x$ in the remaining oxide material; and b) cleaning the etched preform using a cleaning gas containing at least one halogen gas at a sufficient temperature and gas concentration to remove the redeposited germanium containing compound contamination without any substantial further contamination of the remaining deposited oxide material. Preferably the halogen is either chlorine or bromine.

18 Claims, 6 Drawing Sheets

Energy Dispersive X-ray (EDX) Spectra
Zeiss 1500 Series
Scanning Electron Microscope

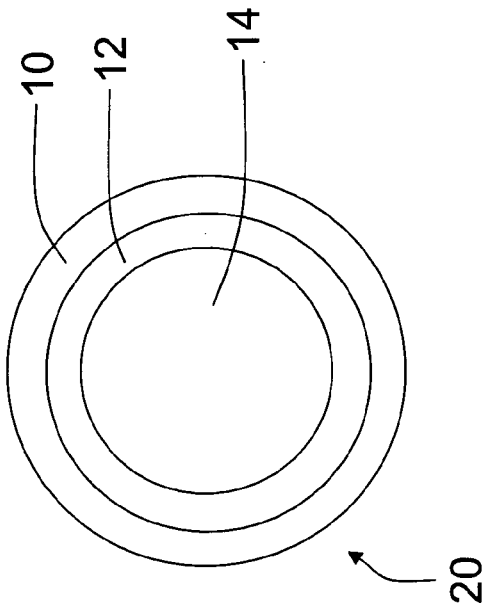
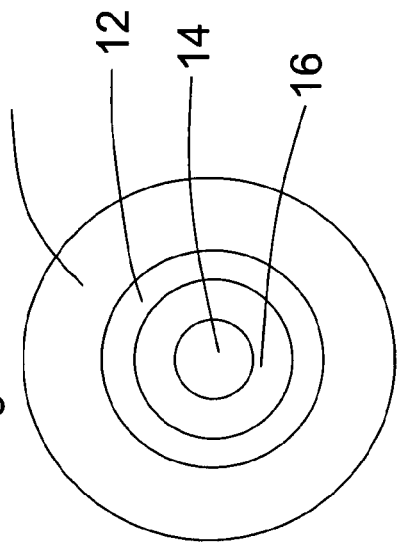
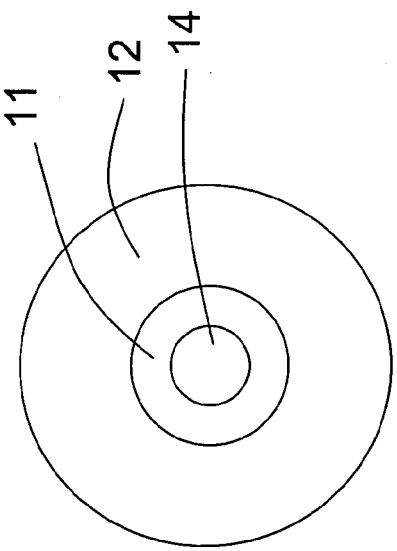

PROCESS FOR PREPARING AN OPTICAL PREFORM

FIELD OF THE INVENTION

This application claims the benefit of priority under 35 U.S.C. §119 (e) of U.S. Provisional Application Ser. No. 61/125,984 filed on Apr. 30, 2008.

BACKGROUND OF THE INVENTION

Technology Background

This invention relates to a method of preparing an optical preform. More particularly, the invention relates to a method of removing or reducing unwanted germanium containing compounds produced during the processing of the preform or by exposure to certain environmental conditions.

Optical fibers have acquired an increasingly important role in the field of communications, frequently replacing existing copper wires. This form of transmission is done by sending a beam of light through an optical fiber. Interference with the light beam or its partial loss during transmission must be at a minimum to make the use of optical fibers as a successful communications technology. The manufacture of optical fibers used for communications is a complicated and time intensive process involving many steps. Each step is another point in the manufacturing process in which defects can be introduced into the product. Typically an optical fiber comprises a core and cladding. The core is used to propagate the light, and the cladding is used to contain (through reflection) the light within the core. Defects in the core (and materials used to form the core) are critical since these defects can hinder the propagation of the light resulting in loss or attenuation of the light through the fiber and therefore a decrease in the distance light can be propagated without being amplified.

Optical fibers can be formed from consolidated preforms by drawing a fiber therefrom. Preforms can be made by a process in which a porous or solid silica based material is deposited on an internal and/or external surface of a glass tube or rod; or a porous silica based material is deposited on an external surface of a removable ceramic rod or tube (i.e., substrate rod or tube). (The porous glass preform is referred to as soot preform herein.) The number of layers of the deposited soot material, the composition of the deposited soot material, and the surface(s) of the removable ceramic rod or tube on which the soot material is deposited are determined based on the type of fiber to be manufactured. The fiber may be, but is not limited to, a step-indexed multimode, graded-index multimode, step-index single-mode, dispersion-shifted single-mode, or dispersion-flattened single-mode fiber. Examples of processes suitable for forming a preform include the outside vapor deposition (OVD), vapor axial deposition (VAD), and inside vapor deposition processes such as modified chemical vapor deposition (MCVD) and plasma assisted chemical vapor deposition (PCVD). Porous preforms, such as those made by an OVD process, are then consolidated to solid glass preforms in a furnace. When a ceramic substrate rod is used, it is removed prior to consolidation of the porous preform to a solid glass preform having an open centerline hole. The solid preforms can be directly drawn into optical fiber or first be further processed to collapse the open centerline hole in a redraw furnace prior to drawing the preform into an optical fiber. The collapsed preforms, i.e., preforms without the centerline opening, are referred to as preform canes. In some cases these canes are referred to as core canes which start from a core preform; in these cases the core canes are typically subjected to additional deposition of silica based material (called overclad) followed by a consolidation step if the silica based material is deposited on the cane in a porous form. Collapsing the consolidated preform centerline hole presents an advantages because solid glass rods can be stored more easily without contaminating the inner layers (i.e., the centerline), which will become the light propagating cores of the optical fibers. In some cases the open centerline hole of the preform is etched to remove defects in the preform resulting from making of the glass or soot preform or occurring during consolidation. These defects result in a refractive index deviation at the center of the core of the optical fibers pulled from such a preform. The refractive index deviation takes the form of spikes or dips and can lower the optical performance of the fiber.

One of the steps in manufacturing an optical fiber is to remove defects such as impurities from the surface of the deposited material by etching the inner surface (centerline hole) of the preform. The etching can take place on an un-collapsed preform or on a partially collapsed preform. During the etching step, etchant gases containing fluorine are flowed through the central opening to remove deposited material from the inner surface of the preform.

SUMMARY OF THE INVENTION

This present invention is directed to a method of preparing an optical fiber preform comprising the steps of:
a) etching an optical fiber preform containing Ge to remove a portion of an oxide material deposited on the preform by using a gas comprising an etchant gas containing fluorine at a sufficient temperature and gas concentration to create a redeposited Ge compound contamination in the remaining oxide material; and
b) cleaning the etched preform using a cleaning gas containing at least one halogen gas at a sufficient temperature and gas concentration to remove the redeposited Ge compound contamination without any substantial further contamination of the remaining deposited oxide material. Preferably, the halogen is either chlorine or bromine. Preferably, the halogen gas does not include fluorine.

In some exemplary embodiments, the cleaning gas further contains at least one oxygen-scavenger gas.

In one embodiment, a process for preparing an optical fiber preform comprises the steps of:
a) etching an optical fiber preform to remove a portion of an oxide material deposited on the preform by using a gas comprising an etchant gas containing fluorine at a sufficient temperature and gas concentration to create a germanium containing (e.g., $GeO_x$ (where $0 \le x \le 2$) contamination layer in the remaining oxide material; and
b) cleaning the etched preform using a cleaning gas containing at least one oxygen-scavenger gas and at least one halogen gas without any substantial further contamination of the remaining deposited oxide material. Preferably, the halogen gas does not include fluorine.

In one embodiment, (i) etchant gases are selected from the group consisting of $CF_4$, $SF_6$, $NF_3$, $C_2F_6$, $C_4F_8$, $CHF_3$, $C_2F_6$ and combinations thereof and (ii) cleaning gas or gases are selected from the group consisting of $Br_2$, $Cl_2$, $CH_3Cl$, $CH_2Cl_2$, $CHCl_3$, $CCl_4$, $COCl_2$, $CO$, $CH_4$, $C_2H_6$, propane, acetylene, ethylene, and/or a saturated, unsaturated, cyclic or aromatic halohydrocarbon, $C_xH_y Halogen_z$, where halogen is Cl or Br, and x is $\ge 1$, $y \ge 0$, and $z > 1$. According to some exemplary embodiments, unsaturated or aromatic halohydrocarbons or chlorides are $C_4Cl_8$, $C_2Cl_4$, and $C_6Cl_6$, respectively, as well as those compounds which also contain H, e.g., $C_6H_5Cl$, and combinations thereof In these embodiments the cleaning gas does not contain a fluorine compound.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings help to better illustrate the invention, and together with the description serve to explain the principles and operation of the invention.

BRIEF DESCRIPTION OF THE DRAWINGS

FIG. 2A is a schematic of the cross section of a glass preform made by OVD process, with a deposited silica based soot around the substrate rod.

FIG. 2B is a schematic of the cross section of a glass preform of FIG. 2A, after the substrate rod has been removed.

FIG. 2C is a schematic of the cross section of a glass tube preform made by a MCVD process.

FIG. 3 is a schematic of the cross section of a partially collapsed, non-etched preform made by a MCVD process.

DETAILED DESCRIPTION OF THE INVENTION

Figure 1A:
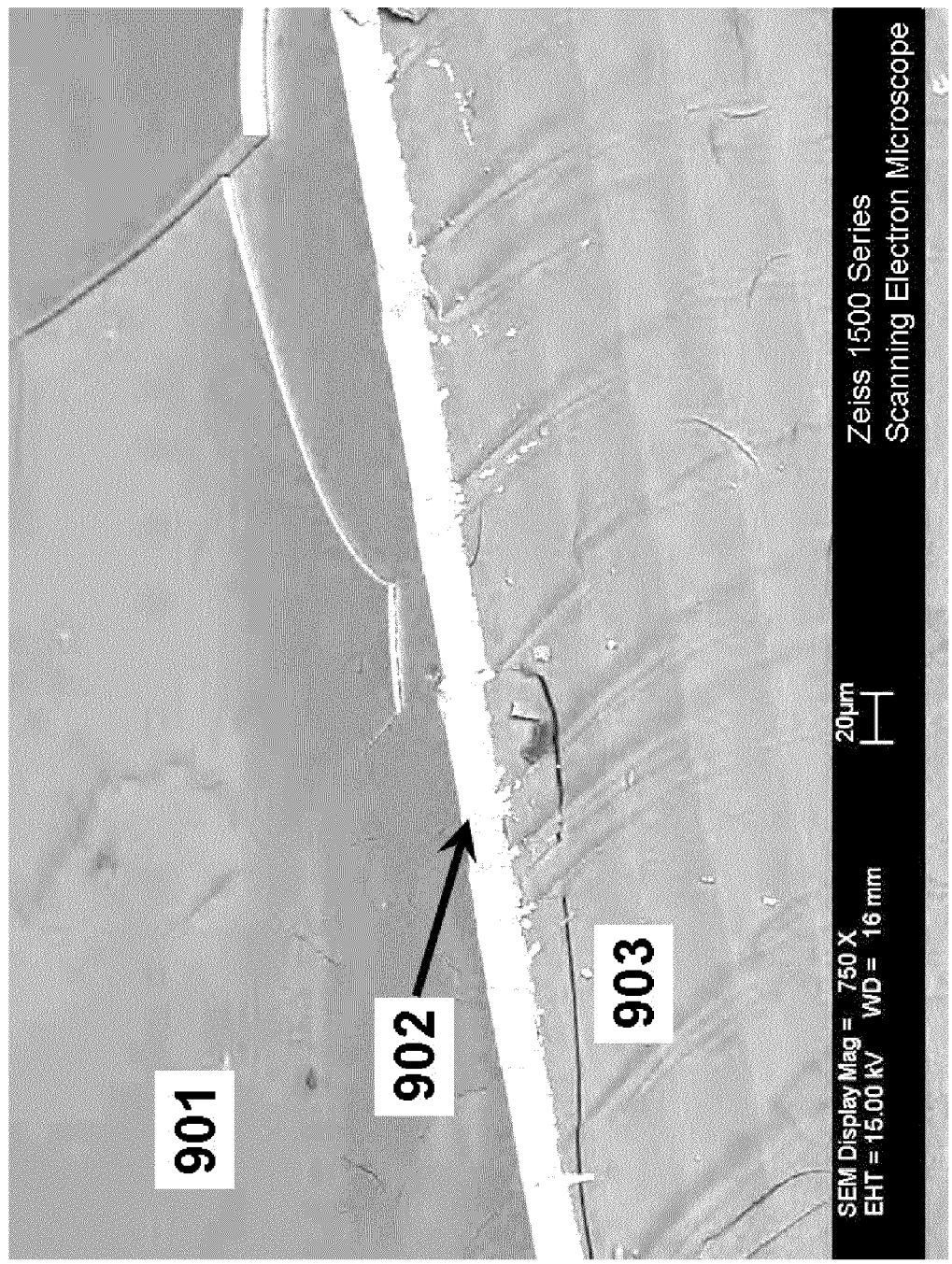
FIG. 1A is a scanning electron microscope (SEM) image of the center portion of a core preform after consolidation/etching, but before cleaning or collapsing of the open centerline hole. This photograph shows deposited material (an unwanted $GeO_x$ layer), which was redeposited during the etching step.

The present invention relates to a process of preparing a fully collapsed optical fiber preform suitable, for example, for manufacturing germanium (Ge) doped single mode or multimode optical fibers.

Multimode fiber preforms manufactured by OVD are made via soot deposition on a ceramic substrate rod to form a desired core profile. As part of the soot deposition process, the first few deposition passes (100 μm to 500 μm of soot deposit) of soot are silica comprising relatively small amounts of germania (e.g, 10-18 wt % of $GeO_2$), followed by a $SiO_2$ soot deposition with greater amount (about 2×) of $GeO_2$, in order to allow the desired $GeO_2$—$SiO_2$ core profile near the centerline to be achieved. The substrate rod is then removed, and the soot preform is placed in a consolidation furnace comprising a helium atmosphere, dried, then consolidated in a furnace to a solid glass core preform. The centerline of the preform is then vapor-phase etched with a fluorine based compound to remove the first few deposition passes, yielding a preform with a $GeO_2$—$SiO_2$ core with a parabolic profile, for example. (Note, the etching step removes glass, and therefore reduces the thickness of the preform.) It has been found however, that even if the original defects are removed through etching with a fluorine compound such as $SF_6$, further defects from fluorine contamination can be incorporated into the surface of the deposited material. This may result in a decrease in the refractive index in the core of the fiber, but certainly not in an elimination of that defect.

In one comparative example following the centerline etching process (where there was no cleaning step), the centerline was then closed under vacuum and core canes were drawn in a redraw furnace. It is noted that the etching process increases the centerline opening by etching out silica-germania glass. The core canes were overcladded with additional silica soot cladding, placed in a furnace, dried, and then consolidated in an atmosphere comprising helium in order to form a solid glass optical fiber preform. This preform was placed in a draw furnace and then drawn to multimode optical fiber. Following each consolidation step, the preforms were placed for approximately 12 hours in an argon purged furnace held at 1000° C., in order to outgas the helium from the preform. We discovered that there are problems with this process, which are described as follows:

1. Centerline etching (i.e., the step of etching out the silica-germania glass on the inner wall of the glass preform tube) utilizes gases containing $SF_6$ and $O_2$ and the etch process removes the small amount of silica-germania glass (that corresponds to the initial 100 μm to 500 μm layer of soot), forming $SiF_4$ (gas), $SO_2$ (gas) and $GeF_4/GeOF_2$ as shown below in Equation 1:

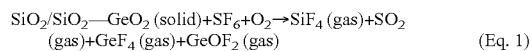

2. We discovered the germanium containing compounds (e.g., $GeF_4/GeOF_2$) plus oxygen and/or heat can decompose to reduced $GeO_xF_y$ (solid, where 0≤x≤2, 0≤y≤4 and 0≤(2x+y)≤4), and form deposits (brown/yellow/white) on the centerline of the preform as represented in Equation 2:

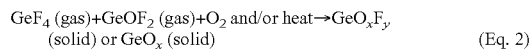

Thus, redeposited germanium compound may be $GeO_xF_y$ or $GeO_x$ where 0≤x≤2. It was also found that some of this redeposited germanium containing material appeared as a fine powder and could be wiped away by rubbing the centerline with a cloth. We identified the source of the redeposited germanium compound (such as $GeO_x$ deposits) to be coming from the fluorine etching process itself It was also found that these deposits occurred near the cooler portions of the preform and preform centerline surfaces. That is, while the fluorine based etch gas was able to etch both $SiO_2$ and $GeO_2$ from the glass preform centerline, at least some of the germanium compounds from the fluorine etch vapor stream redeposited as a solid material on the preform surfaces. These redeposition problems were not expected since once the fluorine based etch gas reacted with the $GeO_2$ in the preform making it into a gas, (e.g., $GeF_4/GeOF_2$), it was expected that these germanium containing gases would remain in the vapor phase and be swept away from the preform centerline and out of the furnace.

3. We also discovered that the germanium containing compound deposits which formed near the centerline caused several problems: 1) local changes in refractive index on the centerline (substantial refractive index variations include spikes, dips and/or plateaus in the refractive index profile of the preform cane), in particular, the high index spike can lead to reduced bandwidth in the optical fiber; 2) $GeO_x$ or $GeO_xF_y$ on the preform centerline decomposed when x≥0 (as shown in Equation 3) during the subsequent steps of redraw to form some $O_2$ seeds trapped in the preform centerline, which in turn resulted in an open airline in the centerline of the fiber drawn from that preform. Furthermore, it was observed that some of the redeposited germanium compounds on the open centerline of the preform volatilized and again redeposited in another portion of the preform during the collapse of the centerline during the vacuum redraw process (i.e., some of this material volatilized from the bottom portion of the preform since it is the first portion of the centerline to collapse, and redeposited on the centerline wall (inner wall) of the upper portion of the open centerline). Thus the redeposited Ge containing contaminant was found along various portions of the collapsed preform and canes. In addition, while some of this $GeO_x$ or $GeO_xF_y$ on the centerline did not form seeds in the collapsed preform and canes themselves, the redeposited centerline $GeO_x$ was found to decompose during the fiber draw process forming centerline oxygen-containing airlines; thus lowering yields of good quality optical fiber,

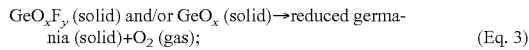

$GeO_xF_y$ (solid) and/or $GeO_x$ (solid)→reduced germania (solid)+$O_2$ (gas); (Eq. 3)

and 3) there were $GeO_x$ or $GeO_xF_y$ particles and deposits found on the interior walls of the consolidation/etching furnace as well as the outside of the preform that may lead to increased fiber breaks and reduced reliability.

Figure 1B:
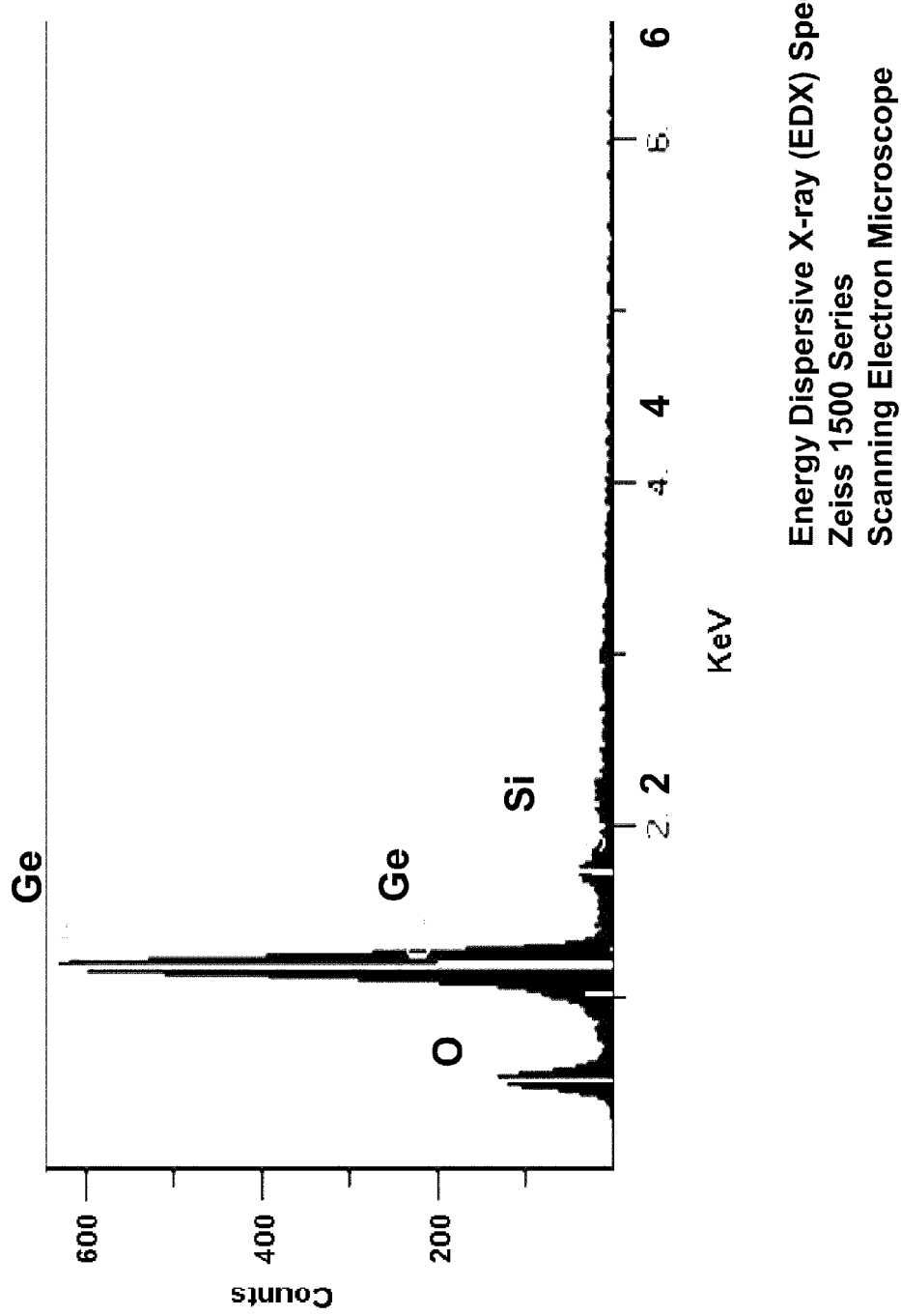
FIG. 1B is an energy dispersive x-ray (EDX) spectrum of the redeposited material image in core preform of FIG. 1A.
Figure 1C:
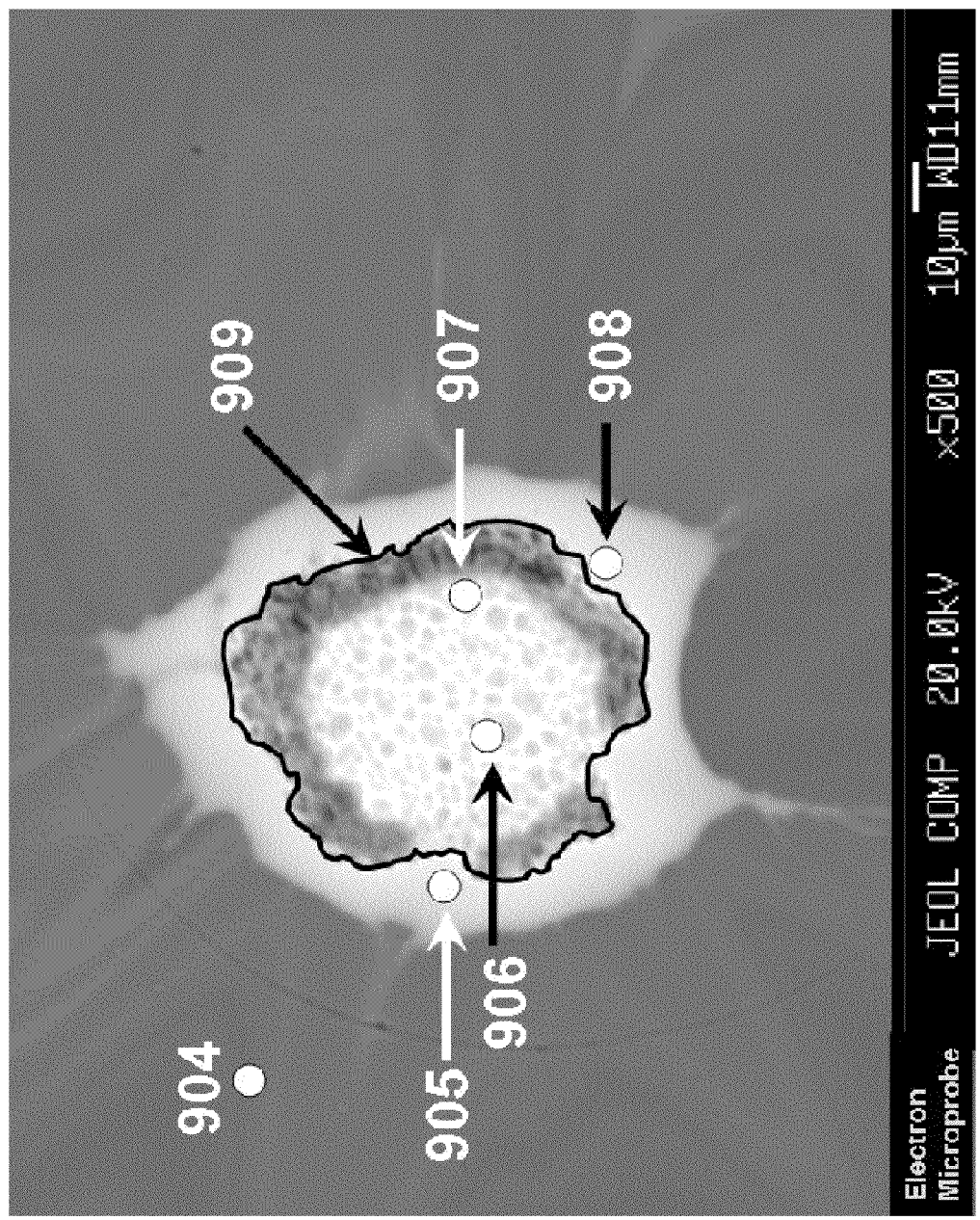
FIG. 1C is an electron microprobe image produced of the center portion of a portion of the collapsed core preform made by a similar process to the preform shown in FIG. 1A, except the centerline was collapsed. This figure shows redeposited $GeO_x$ near the centerline, and a crater (void/seed) caused by $GeO_x$ decomposition to an $O_2$ seed, surrounded by high concentrations of Ge and/or $GeO_2$.

FIGS. 1A, 1B and 1C illustrate some of the above issues. A multimode silica based core preform with a parabolic profile (+2% delta refractive index relative to $SiO_2$, due to 36% by weight $GeO_2$ dopant) manufactured as described above in the comparative example was analyzed and the results are shown in FIGS. 1A, 1B and 1C. More specifically, FIG. 1A is a scanning electron microscope or SEM (Zeiss 1500 series scanning electron microscope, from Carl Zeiss SMT, Inc., of Thornwood, N.Y.) image of this core preform, after consolidation/etching, and where there was no cleaning or collapsing process used after the etch step (see Comparative Example 1). FIG. 1A is a SEM photograph of the core preform cross-section and shows a $GeO_x$ layer (Area 901 (top surface) and 902 (cross-sectional area of $GeO_x$ layer)) which resulted from redeposition during etching. This layer, at least in some locations, was about 20 μm thick (Area 902 in FIG. 1A). The centerline glassy section of the etched portion of the preform is identified by Area 903 in FIG. 1A.

FIG. 1B shows an energy dispersive x-ray EDX analysis of redeposited material from the core preform of FIG. 1A, showing that this layer is a Ge containing compound ($GeO_x$ layer, where 0≤x≤2).

FIG. 1C is a characterized electron microprobe (JEOL 8200 SuperProbe, JEOL USA Corp., Peabody, Mass.) image of the center portion of the collapsed core preform (+2% delta refractive index vs. silica, 36% by weight $GeO_2$) made by a similar process to the one shown in FIG. 1A, except the centerline was collapsed. These results show redeposited $GeO_x$ material on the centerline from the etching process, and a crater (void/seed) caused by $GeO_x$ decomposition to an $O_2$ seed. The gas composition in these seeds was characterized separately by single quadrupole mass spectrometer, model GIA 522 gas inclusion analyzer (InProcess Instruments, of Bremen, Germany); this seed gas composition was found to be almost pure $O_2$. Although a uniform 36% by weight $GeO_2$ was deposited during the glass forming process (and found in Area 904, FIG. 1C just away from the centerline) in this glass region to produce 2% refractive index delta (relative to silica), surprisingly much higher concentrations of $GeO_2$ (e.g., 62%, 74%, 81% and 65% (by weight) in Areas 905, 906, 907, 908 respectively in FIG. 1C) was present around $O_2$ seeds (inside Area 909 is a crater caused by an oxygen seed) thus indicating the mechanism of this problem (high germania and oxygen seeds) was stemming from the etching process itself According to the embodiments of the present invention, the process for preparing an optical fiber preform to remove the refractive index variations caused by these dopant variations involves two steps: an etching step and cleaning step.

For example, a process for preparing an optical fiber preform may comprise the steps of:
a) etching an optical fiber preform containing Ge to remove a portion of an oxide material deposited on the preform by using a gas comprising an etchant gas containing fluorine at a sufficient temperature and gas concentration to create a redeposited Ge compound contamination in the remaining oxide material; and
b) cleaning the etched preform using a cleaning gas containing at least one halogen gas at a sufficient temperature and gas concentration to remove the redeposited Ge compound contamination (e.g., $GeO_xF_y$) without any substantial further contamination of the remaining deposited oxide material, wherein the halogen gas does not contain fluorine, because of fluorine's strong etchant properties. Preferably the halogen gas is either chlorine or bromine, or a combination thereof.

The cleaning step may be followed by a collapsing step optionally with a vacuum applied to the centerline (e.g., at about 1700° C. to 2200° C.) to eliminate the centerline hole.

For example, a method of making a Ge doped fiber preform according to some embodiments may include the steps of: 1) depositing $GeO_2$—$SiO_2$ soot on a substrate rod; 2) removing the substrate rod to form the centerline hole 14; 3) placing the soot preform in a consolidation furnace and drying the consolidated preform in an atmosphere comprising $Cl_2$ to remove moisture (i.e., OH); 4) consolidating the dried soot preform to a solid glass preform having an open centerline hole; 5) etching the wall of centerline hole of the consolidated preform with etchant gases (e.g., $SF_6/O_2$); 6) cleaning the centerline hole of the etched preform with a halogen containing gas to remove redeposited $GeO_x$ (e.g., via $Cl_2$+, plus He), wherein there is no fluorine containing etching gas in this cleaning step. These steps may be followed by: (i) redraw in order to collapse the centerline hole, (ii) overcladding with silica based soot, (iii) overclad consolidation, and (iv) fiber draw.

More specifically, this process may include the steps of (i) collapsing and eliminating the open centerline of the optical fiber preform, thus forming a collapsed preform; (ii) redrawing the collapsed preform into a glass rod; (iii) overcladding the glass rod with a silica based soot to form an overclad preform; then drying and then consolidating the (dried) overclad preform; and (iv) drawing an optical fiber from the overclad preform. Alternatively the optical fiber may be drawn from the collapsed preform.

Advantageously, the present invention can be used to help process both single-mode and multi-mode preforms for optical fibers, where the fibers are manufactured by processes in which at least one vitreous, crystalline or semi-crystalline oxide material is deposited on the preform using conventional deposition processes. For example, as shown in FIGS. 2A and 2B, a multimode fiber preform manufactured by OVD is made via soot deposition of oxide materials 12 (e.g., $SiO_2$ and GeO$_2$) on a substrate rod 15 to form a core profile. As part of the soot deposition process, the first few passes 11 (approximately 100 to 500 microns) of soot comprising lower levels of germania (e.g., 10 to 20 weight percent of GeO$_2$), followed by more oxide material (e.g., SiO$_2$ with more germania, for example, 18 to 36 weight percent GeO$_2$) soot deposition 12, in order to provide the desired GeO$_2$—SiO$_2$ core profile near the centerline. The substrate rod 15 is then removed, resulting in a hole or opening 14 (also referred to as the centerline hole herein) in the preform, and the soot preform is consolidated in a furnace to a solid glass preform with an open centerline hole. Preferably, the exemplary preforms have an outer diameter of from about 20 to about 200 mm. Preferably the diameter of the opening 14 is less than 20 mm, for example 3 mm to 10 mm, or 4 mm to 5 mm. The solid preforms 20 can be directly drawn into optical fiber or first be further processed to collapse the open centerline hole in a redraw furnace prior to drawing the preform into an optical fiber. Preferably, the centerline of the preform or tube 20 is at least partially collapsed prior to being drawn into fiber. Collapsed preforms can also be referred to as preform canes. In some cases these canes are referred to as core canes which start from a core preform; in these cases the core canes are typically subjected to additional deposition of silica based material (called overclad) followed by a consolidation step if the silica based material is deposited on the cane in a porous form. The overclad preform 120 can be drawn into optical fiber.

Alternatively, as represented by FIG. 2C, another embodiment of the present invention is used to prepare deposited oxide materials 12 (e.g., SiO$_2$ and GeO$_2$) which are applied to the inside of the glass or quartz preform tube 10 (e.g., using the modified chemical vapor deposition (MCVD) process or plasma chemical vapor deposition (PCVD) process) resulting in a hole or opening 14 in the preform. It is envisioned that the process described herein could be used to etch and clean different core materials for a variety of fiber applications. Preferably, the exemplary preforms prior to collapsing and deposition of oxide material have an inner diameter of from about 10 to about 60 mm, an outer diameter of from about 12 mm to about 70 mm, and a wall thickness of from about 1 mm to about 10 mm.

The deposited material 12 comprises at least one layer of oxide material, but could comprise for example, up to several hundred layers of oxide material (e.g., preforms for graded index multimode fibers are made by depositing up to several hundred layers of deposited vitreous oxide to approximate a smooth parabolic curve). The thickness of the deposited material and the number of layers (and their thickness and composition) to the deposited material depends on the type of optical fiber for which the preform is being used including but not limited to for example step-index multimode, graded-index multimode, step-index single-mode, dispersion shifted single-mode, or dispersion flattened single-mode fibers. The deposited oxide material layer thickness is, however, generally from about 10 μm to about 10000 μm.

As stated above, the consolidated preform or glass tube 20 can be used to draw an optical fiber. Preferably, the tube 20 is collapsed prior to being drawn into fiber. The tube 20 is preferably collapsed at temperatures at or above the softening point of the glass and the deposited material. The collapsed tubes are also referred to as core canes herein. The core canes are typically subjected to additional deposition of silica based material (called overclad) followed by a consolidation step if the silica based material is deposited on the cane in a porous form. The overclad preform 120 can be drawn into optical fiber.

During the step of collapsing the tube 20 (glass tube), as shown by the schematic in FIG. 3, in addition to surface defects that may exist in the deposited material near the surface from the manufacturing and processing steps, highly volatile components (or dopants) of the deposited material may evaporate or migrate out of the deposited material(s) 12 employed. These volatilized species may then, due to the high collapsing temperatures, be redeposited elsewhere on the deposited material thereby creating a region 16 of non-uniform amounts of dopants at the surface of the deposited material. Among them is germanium dioxide (GeO$_2$). The exact depth of the depletion of the dopant will depend on the processing conditions required to collapse or partially collapse the preform.

Preferably, it is during the process for collapsing the preform, or after partially collapsing the preform that the surface of the deposited oxide material is etched to remove unwanted deposits or defects at or near the surface from the oxide material, prior to completely collapsing the preform. By etching the preform during the collapsing process or after partially collapsing the preform (rather than prior to entirely collapsing the preform), the risk of further defects being incorporated into the deposited material is lowered. More preferably, the preform is partially collapsed prior to beginning the etching process. However, as we have discovered, the etching process can also lead to redeposition of unwanted species (for example, GeO$_x$F$_y$, or GeO$_x$, such as GeO$_2$) which can cause centerline index spikes as well as centerline seeds in the preform which will result in a centerline airline in the fiber drawn from that preform; optical fibers with these types of defects can lower manufacturing yields substantially. When the preform is partially collapsed prior to beginning the etching process, preferably, the inner diameter of the partially collapsed preform is less than about 10 mm, more preferably equal to or less than about 5 mm, more preferably less than about 3 mm, and most preferably from about 0.5 mm to about 2 mm. Also, preferably the inner diameter along the entire length of the axis of the preform (not shown) is substantially uniform to help maintain a uniform etch across the preform. By substantially uniform we mean that the inner diameter of the preform does not vary by more than 5% along the entire length of the axis of the preform.

The process of the present invention preferably comprises the steps of first etching a preform with a deposited oxide material to remove a portion of: (i) silica based material originally deposited on the substrate rod and some of the oxide material from the preform (if OVD process has been used to make the preform), or (ii) oxide material from the preform 20 (if MCVD process or plasma chemical vapor deposition (PCVD) process was used make the preform 20), by using an etchant gas containing fluorine at a sufficient temperature and gas concentration to create a contamination layer in the remaining oxide material. This etching step involves flowing a gas across the surface of the silica or/and deposited oxide material to remove a portion of that material. An etchant gas is a gas, which under the appropriate conditions (e.g., temperature and concentration) is capable of removing crystalline or vitreous oxide materials through chemical action. Examples of preferred etchant gases include but are not limited to CF$_4$, SF$_6$, NF$_3$, C$_2$F$_6$, C$_4$F$_8$, CHF$_3$, CClF$_3$, CCl$_2$F$_2$, CCl$_3$F, SiF$_4$ and combinations thereof One particularly preferred family of etchant gas is fluorine based gas compounds. More preferably, the etchant gas is selected from the group consisting of CF$_4$, SF$_6$, NF$_3$, C$_2$F$_6$, C$_4$F$_8$, CHF$_3$, SiF$_4$ and combinations thereof, and most preferably SF$_6$. The gas can further comprise additional non-fluorinated gases which can be used in combination with the etchant gas.

One such preferred additional gas is oxygen. The concentration of the etchant gas and the temperature at which the gas flows across the surface of the oxide material affects the rate of removal of the deposited oxide material and/or contaminated region by the etchant gas. Preferably, the combination of the temperature and etchant gas concentration is sufficient to allow for a rapid etching rate (removal rate) of the deposited oxide material, which optimally results in decreasing the processing time of the preform. Preferably, the etchant gas used for the first etching step has a flow rate of at least about 25 standard cubic centimeters per minute ("sccm") across the surface of the deposited oxide material, in some embodiments of at least about 50 sccm, and in some other embodiments of at least about 90 sccm. If the gas comprises an additional gas added to the etch gas stream such as oxygen, preferably the flow rate of the additional gas is from about 60 to about 300 sccm, in some embodiments from about 150 to about 250 sccm and in some other embodiments from about 190 to about 210 sccm. In some embodiments there is a diluent carrier gas such as helium, nitrogen or argon added to the etch gas stream; in these cases, the flow rate is preferably from about 200 to about 3000 sccm. Preferably, the temperature of the gas contacting the preform during the etching step is less than about 1700° C. and greater than 1300° C., more preferably less than about 1600° C. (e.g., 1350° C.-1575° C.) and most preferably equal to or less than about 1550° C. (e.g., 1350° C., 1400° C., 1475° C., 1525° C.). As discussed above, the etchant gas utilizes gases containing fluorine (e.g., combination $SF_6$ and $O_2$) and the etch process produces $SiF_4$ (gas), $SO_2$ (gas) and $GeF_4$ (gas) and $GeOF_2$ (gas) and produces Ge and F containing compound(s) such as $GeF_4$ (gas) and $GeOF_2$ (gas), as shown, for example, in (Eq. 1). Then these gases ($GeF_4$ and $GeOF_2$) decompose to reduced Ge containing compounds, such as $GeO_xF_y$ and form deposits (Eq. 2) at or adjacent to inner walls of the preform (i.e., adjacent to the opening 14) of the consolidated preform 20.

As discussed above, this creates a contamination layer near the centerline of preform 20 of $GeO_x$, where $0 \leq x \leq 2$, which in turn changes the refractive index profile of the resultant preform, and ultimately of the optical fiber drawn from this material and the corresponding optical performance such as bandwidth. We also discovered that the $GeO_x$ deposits which formed near the centerline resulted in $GeO_x$ decomposition in redraw and fiber draw to form $O_2$ seeds (surrounded by high concentrations of $GeO_x$ (e.g., 60%-90% by weight of $GeO_2$) trapped in the preform centerline which in turn resulted in an open airline in the centerline of the fiber drawn from that preform; thus lowering yields of good quality optical fiber, and there were $GeO_x$ particles and deposits found on the interior walls of the consolidation/etching furnace as well as the outside of the preform that may lead to increased fiber breaks and reduced reliability.

The contamination layer is the depth of any substantial contamination in the oxide material caused by the etchant gases. Substantial contamination is as defined in this application as the area in the oxide material with any noticeable change in refractive index or chemical composition as a result of contamination caused by the etchant gases in the oxide material. The contamination layer may be located by measuring the change in refractive index or thickness of the oxide material. For example a contamination layer thickness in the optical preform 20 could be greater than 0.1 microns (i.e., 0.2 µm, 1 µm, 5 µm, 20 µm, or at least 100 µm).

The process for preparing the optical fiber preform further comprises the step of cleaning the preform 20 using cleaning gases containing a halogen and optionally an oxygen-scavenger (oxygen-scavenger is a material which reacts with a species which comprises an oxygen atom(s) to remove that oxygen atom(s) from the species) at a sufficient temperature and cleaning gas concentration to remove the contamination layer (e.g., redeposited $GeO_x$ material) from the preform. The cleaning step involves flowing these cleaning gases across the surface of the deposited oxide material (through the opening 14). Preferably, the cleaning step is performed at temperatures of $800° C. \leq T \leq 1600° C.$ (where T is the temperature of the cleaning gas contacting the preform), preferably for 1 minute to about 2 hours, more preferably for 1 hour or less, typically for 5 to 60 minutes (e.g., 5 min, 10 min, 15 min, or 30 min).

The cleaning step is used to remove at least a portion, and preferably all of the contamination layer (e.g., redeposited $GeO_x$ material) from the center line of the consolidated preform 20 (and furnace), by using a vapor-phase cleaning process after centerline etching and before redraw. The vapor-phase cleaning gases comprise a halogen and optionally an oxygen-scavenger. In the exemplary embodiments shown below, carbon monoxide is used as the oxygen-scavenger and chlorine, $Cl_2$, is used as the halogen. More specifically, an oxygen scavenger, such as CO scavenges the oxygen while a halogen (such as chlorine, $Cl_2$, for example) converts Ge containing species to a gas and $CO_2$ and $GeCl_4$ gases are then swept out of the furnace, as shown below in Equation 4, for example.

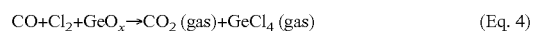

$$CO + Cl_2 + GeO_x \rightarrow CO_2 \text{ (gas)} + GeCl_4 \text{ (gas)} \quad \text{(Eq. 4)}$$

In some embodiments, the halogen containing gas (e.g., $Cl_2$ or $Br_2$) can convert the germanium containing material (e.g., such as $GeO_x$) to a gas, and the resultant $GeCl_4$ and $O_2$ gases are then swept out of the furnace, as shown below in Equation 5, for example.

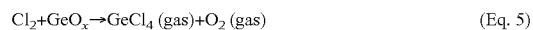

$$Cl_2 + GeO_x \rightarrow GeCl_4 \text{ (gas)} + O_2 \text{ (gas)} \quad \text{(Eq. 5)}$$

Other oxygen-scavenger gases may also be used (e.g., $CH_4$, $C_2H_6$, propane, acetylene, ethylene, etc.) and some gases may contain both an oxygen-scavenger and halogen in the same molecule (e.g., $CH_3Cl$, $CH_2Cl_2$, $CHCl_3$, $COCl_2$, and/or saturated halohydrocarbon and/or cyclic, unsaturated or aromatic chlorides or bromides, $C_xH_y\text{Halogen}_z$, where halogen is Cl or Br, and x is $\geq 1$, $y \geq 0$ and $z \geq 1$; examples include $C_4Cl_8$, $C_2Cl_4$, and $C_6Cl_6$, as well as those compounds which also contain H, i.e., $C_6H_5Cl$). Halogens other than $Cl_2$ may also be utilized. For example, bromine, $Br_2$, may be used in place of $Cl_2$. In these embodiments the cleaning gas does not contain a fluorine compound.

The cleaning step utilizes concentration of halogen gas(es) and oxygen-scavenger gas(es) and temperature whereby the contaminating material (e.g., unwanted, redeposited $GeO_x$) is removed at such a rate that material is removed without further contamination of the preform 20. Therefore, the cleaning gas is applied to the preform surface at a sufficient temperature and gas concentration to remove the contamination layer/material(s) without any substantial further contamination of the remaining oxide material.

Preferably, the cleaning gas used for the cleaning step has a flow rate for each gas of at least about 25 standard cubic centimeters per minute ("sccm") across the surface of the deposited oxide material, in some embodiments of at least about 50 sccm, and in some other embodiments of at least about 90 sccm. In some embodiments there is a diluent carrier gas such as helium, nitrogen or argon added to the etch gas stream; in these cases, the flow rate is preferably from about 200 to about 3000 sccm. Preferably, the temperature of the cleaning step is between 800° C. to 1600° C., more preferably between about 1000° C. to 1500° C. (e.g., 1000° C., 1200° C., 1400° C.). The cleaning process also removes GeO$_x$ and other deposits found on the interior walls of the consolidation/etching furnace as well as the outside of the preform that may lead to increased fiber breaks and reduced reliability.

Finally, if the preform 20 is being collapsed during the etching process then preferably the process is organized in such a way as to allow a complete removal of any defect at the surface of the preform that would affect the light transmission of the optical fiber produced from such preform prior to completely collapsing the preform into a glass rod, which then can be drawn into optical fibers. If the preform is partially collapsed, then the process further includes the step of completing the collapse of the preform into a glass rod, which then can be drawn into optical fibers or further overclad with additional silica based materials and then be drawn into optical fibers.

EXAMPLES

The present invention will be further clarified by the following Examples, which are intended to be exemplary of the invention.

Example 1

Cleaning Step

Figure 4:
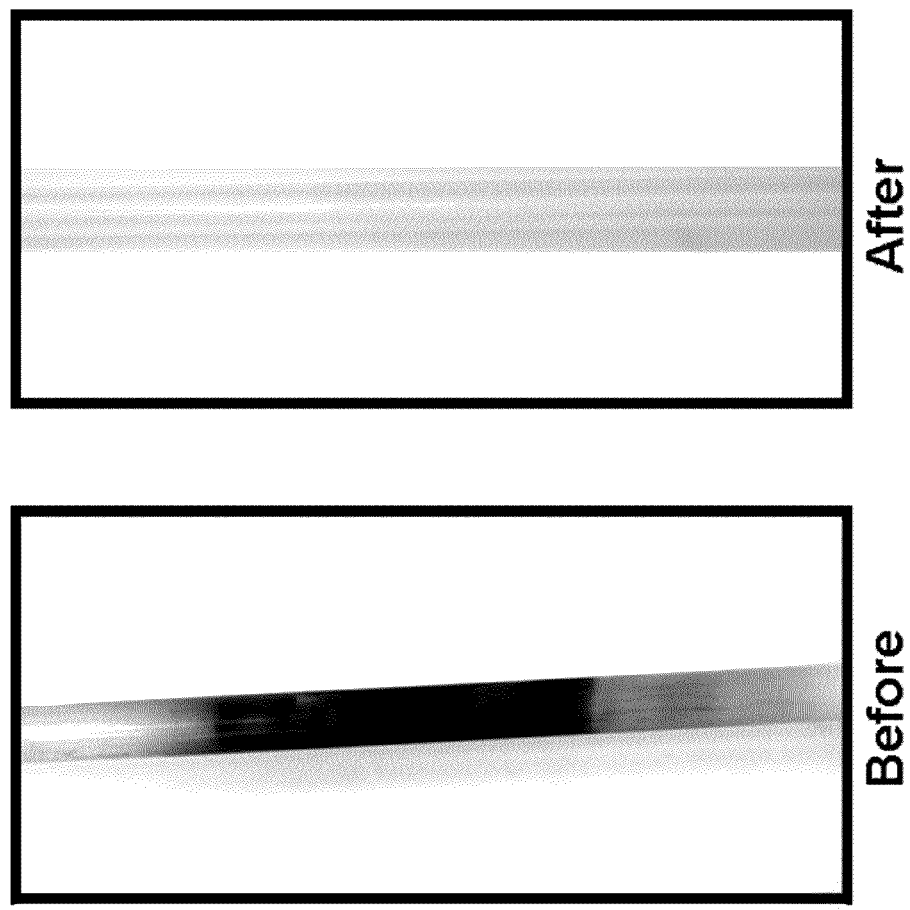
FIG. 4 is a photograph of a glass tube preform, before and after cleaning.

A silica based, silica preform tube with a large amount of redeposited germanium and germanium oxides (i.e., GeO$_x$) compounds inside the tube (See FIG. 4, left side) was cleaned by using a vapor-phase cleaning process. The vapor-phase cleaning gases comprised carbon monoxide, CO, and chlorine, Cl$_2$, along with a carrier gas of helium. The cleaning gases were passed through the centerline opening 14 as well as around the outside of the preform tube by suspending the preform tube in a quartz-lined furnace for 1 hr at a temperature of 1125° C. Cleaning gas flows into the furnace in SLPM (standard liters per minute) was as follows: 5.0/0.50/5.0 SLPM of He/Cl$_2$ (He containing 10% by volume CO), respectively, i.e., 4.8% CO and 4.8% Cl$_2$ by volume in helium. The preform (i.e., preform tube) was allowed to cool to room temperature, examined, and showed a clean centerline hole and no evidence of the redeposited GeO$_x$ remaining after cleaning (FIG. 4, right hand side). It is also possible to use less CO and Cl$_2$ with increased cleaning temperature.

Example 2

Cleaning Step

A second silica based, silica preform tube with a large amount of redeposited germanium and germanium oxides (i.e., GeO$_x$) compounds inside the tube was cleaned by using a vapor-phase cleaning process. The vapor-phase cleaning gases comprised carbon monoxide, CO, and chlorine, Cl$_2$ along with a carrier gas of helium. The cleaning gases were passed through the centerline opening 14 as well as around the outside of the tube by suspending the tube in a 6" diameter quartz-lined furnace for 1 hr at a temperature of 1000° C. Cleaning gas flows into the furnace in SLPM (standard liters per minute) was as follows: 5.0/0.50/5.0 SLPM of He/Cl$_2$/ (He containing 10% by volume CO), respectively, i.e., 4.8% CO and 4.8% Cl$_2$ by volume in helium. The preform (i.e., preform tube) was allowed to cool to room temperature, examined, and showed a clean centerline hole and no evidence of the redeposited GeO$_x$ remaining after cleaning.

Example 3

Etching and Cleaning Steps

A similar set of experiments were run on core preforms having a 2% delta (vs. silica), 36% by weight GeO$_2$ and a parabolic shaped profile as follows. Approximately 7500 grams of GeO$_2$—SiO$_2$ soot having a density of about 0.5 grams/cc were OVD deposited on a 1 meter long by approximately 12 mm diameter removable ceramic rod (substrate rod) to produce the core soot preform. The substrate rod was then removed and the soot preform was placed in a quartz-lined furnace set at 1000° C. then dried in atmosphere comprising helium and approximately 1 volume % each of chlorine and oxygen gases. The soot preform was then sintered in an atmosphere comprising helium to a dense glass preform (with a centerline hole) by lowering it through a hot zone set at approximately 1400° C.-1450° C. The centerline of this preform was then vapor phase etched at this temperature by flowing SF$_6$+O$_2$+He (approximately 90, 100, 500 sccm, respectively) through the centerline hole of the preform for approximately 60 minutes while moving the preform through the hot zone. The preform was then cooled to 1000° C. by raising it into the upper portion of the furnace. The centerline was then cleaned by flowing Cl$_2$+CO+He (approximately 100, 100, 1900 sccm, respectively) through the centerline hole of the preform for approximately 60 minutes. The centerline hole remained open. The preform was allowed to cool to room temperature, examined and showed a clean centerline hole and no evidence of the redeposited GeO$_x$.

Example 4

Etching and Cleaning Steps

A similar core preform as that produced in Example 3 was made by a similar process to that described in Example 3 (i.e., the etching step that followed by the cleaning step), except after the cleaning process the preform was redrawn to approximately 25 mm diameter canes in a redraw furnace with vacuum applied to the centerline in order to close and eliminate the centerline hole. The solid glass canes were examined by microscopy and for refractive index were found to have no seeds and no redeposited germanium compounds on the centerline.

Example 5

Etching and Cleaning Steps

A similar core preform as that produced in Example 3 was made by a similar process to that described in Example 3 (i.e., the manufacturing process utilized an etching step that followed by the cleaning step), except after the cleaning process the preform was redrawn to approximately 25 mm diameter canes in a redraw furnace with vacuum applied to the centerline in order to close and eliminate the centerline hole. The solid glass canes were examined by microscopy and for refractive index and were found to have no seeds and no redeposited germanium compounds on the centerline. One of the 1 meter canes was then placed back on an OVD lathe and approximately 3200 grams of silica soot having a density of about 0.5 grams/cc was deposited in order to produce an overclad soot preform. This preform was then placed into a quartz-lined consolidation furnace, dried at about 1100° C. in an atmosphere comprising helium and approximately 3 volume % chlorine then sintered to a fully dense preform by lowering it through a hot zone set at approximately 1450-1500° C. The preform was then placed in an argon purged holding oven held at approximately 1000° C. overnight to outgas dissolved helium, then the entire preform was drawn to 125 micron diameter optical fiber (more than 100 km) on an optical fiber draw equipped with an optical detector to determine airline holes in the fiber. The fiber drawn from this preform was found to have no airline holes, thus showing that the cleaning process eliminated the problem of oxygen seeds and the corresponding airline holes by removing the contamination from the optical preform.

Example 6

Etching and Cleaning Steps

A similar core preform (however having a 1% delta (vs. silica), approximately 18% by weight $GeO_2$ and a parabolic shaped profile) as that produced in Example 3 was made (i.e., the manufacturing process utilized an etching step that followed by the cleaning step), except after the cleaning process the preform was redrawn to approximately 25 mm diameter canes in a redraw furnace with vacuum applied to the centerline in order to close and eliminate the centerline hole. The solid glass canes were examined by microscopy and for refractive index and were found to have no seeds and no redeposited germanium compounds on the centerline. One of the 1 meter canes was then placed back on an OVD lathe and approximately 5700 grams of silica soot having a density of about 0.5 grams/cc was deposited in order to produce an overclad soot preform. This preform was then placed into a quartz-lined consolidation furnace, dried at about 1100° C. in an atmosphere comprising helium and approximately 3 volume % chlorine then sintered to a fully dense preform by lowering it through a hot zone set at approximately 1450-1500° C. The preform was then placed in an argon purged holding oven held at approximately 1000° C. overnight to outgas dissolved helium, then the entire preform was drawn to 125 micron diameter optical fiber (>100 km) on an optical fiber draw equipped with an optical detector to determine airline holes in the fiber. The fiber drawn from this preform was found to have very few airline holes corresponding to about 7 to 8 airline holes per 1000 km of optical fiber, thus showing that the cleaning process significantly lowered the problem of oxygen seeds and the corresponding airline holes by removing the contamination from the optical preform.

Example 7

Cleaning Step

Figure 5:
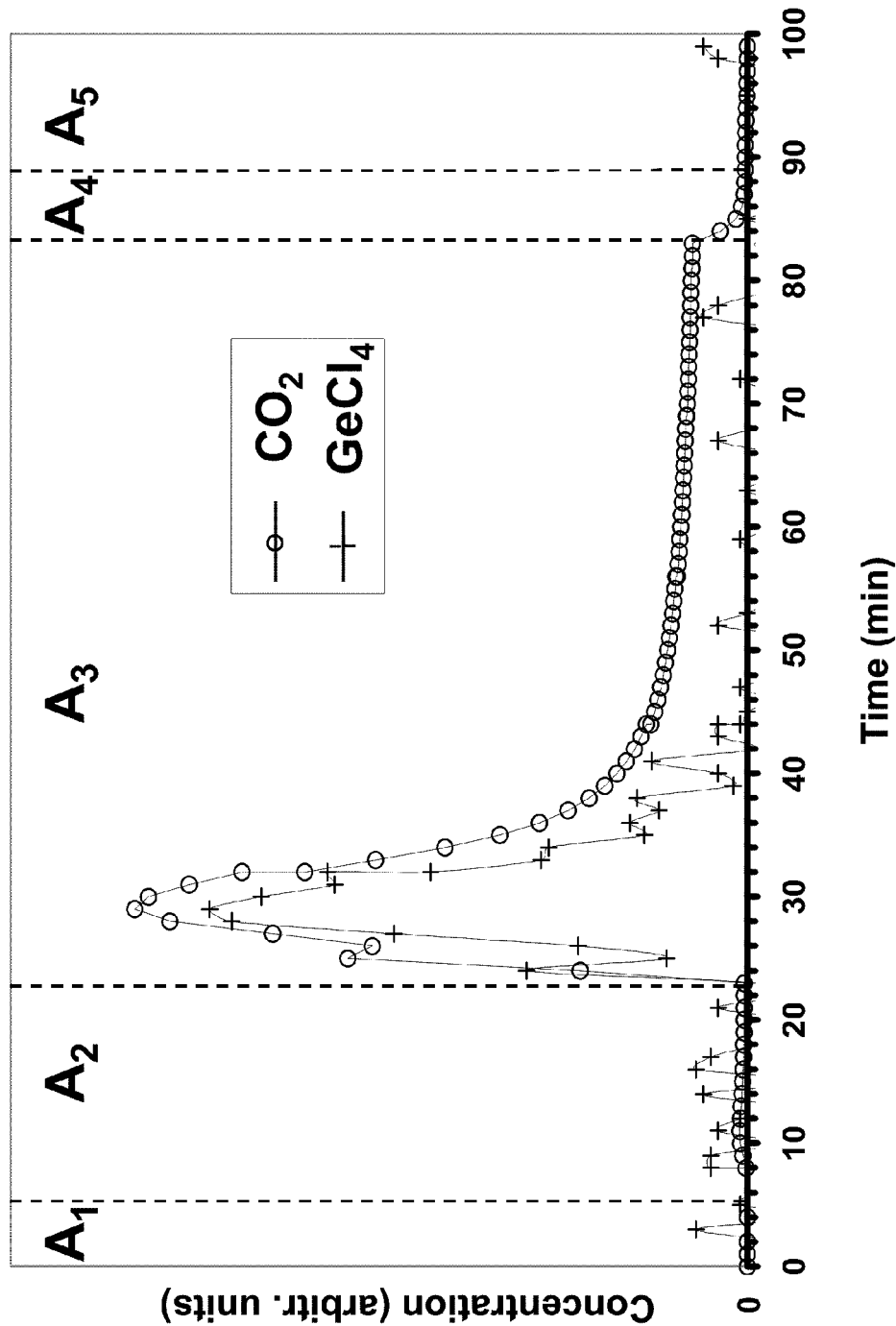
FIG. 5 is a graph showing exhaust gas composition (via Fourier Transform Infrared Spectroscopy, FTIR) of a silica soot preform containing 18% by weight $GeO_2$.

FIG. 5 illustrates an experiment run in which the exhaust gas composition was monitored as a function of time by FTIR (Fourier Transform Infrared Spectroscopy) of an approximate 5 gram portion of silica soot preform containing 18% by weight $GeO_2$, having a density of approximately 0.5 grams/cc, heated in fused quartz tube lined tube furnace in an atmosphere comprising 5% $CO+5\%$ $Cl_2$ (both by volume) in helium at 1000° C. In FIG. 5 the notations are as follows: Area A1 was when only helium flowed past the preform sample while the sample was at 25° C.; Area A2 was when helium comprising 5% $CO+5\%$ $Cl_2$ flowed past the preform sample while the sample was at 25° C.; Area A3 was when helium comprising 5% $CO+5\%$ $Cl_2$ flowed past the preform sample while the sample was at 1000° C.; Area A4 was when only helium comprising 5% $CO+5\%$ $Cl_2$ flowed past the preform sample while the sample was cooled back to 25° C. over about a 5 minute period; Area A5 was at the end of the experimental run when only helium flowed past the preform sample while the sample was at 25° C. No $SiCl_4$ was detected in this experiment in the exhaust gas stream thus indicating the $SiO_2$ portion of the soot preform was not etched. The data shown in this experiment confirmed our hypothesis for the reaction: $GeO_2+CO+Cl_2 \rightarrow GeCl_4+CO_2$ resulted in the selective removal of $GeO_2$ from the soot preform.

Comparative Example 1

Etching Step Only

A similar core preform having a 2% delta (vs. silica), 36% by weight $GeO_2$ and a parabolic shaped profile similar to that produced in Example 3 was made, except that after the centerline etching step the cleaning process step was not performed. More specifically, approximately 7500 grams of $GeO_2$—$SiO_2$ soot (having a 2% delta (vs. silica), 36% by weight $GeO_2$ and a parabolic shaped profile) having a density of about 0.5 grams/cc were OVD deposited on a 1 meter long by approximately 12 mm diameter ceramic substrate rod to produce a core soot preform. The substrate rod was removed and the soot preform was placed in a quartz-lined furnace set at 1000° C. then dried in an atmosphere comprising helium and approximately 1 volume % each of chlorine and oxygen gases. The soot preform was then sintered in an atmosphere comprising helium to a dense glass preform (with a centerline hole) by lowering it through a hot zone set at approximately 1400° C.-1450° C. The centerline of this preform was then vapor phase etched by flowing $SF_6+O_2+He$ (approximately 90, 100, 500 sccm, respectively) through the centerline hole of the preform for approximately 60 minutes while moving the preform through the hot zone. As stated above, in this comparative example, there was no cleaning process used after the etch process. The preform was then cooled to 1000° C. by raising it into the upper portion of the furnace. The centerline hole remained open. The preform was allowed to cool to room temperature, examined and showed a contaminated centerline hole and a large quantity of the redeposited $GeO_x$, as described above in FIGS. 1A and 1B. It was also found that some of this redeposited material could be wiped away by rubbing the centerline with a cloth. Thus, this comparative example demonstrated that the etching process step resulted in redeposited germanium-containing compounds on the preform and perform centerline surfaces, and without the cleaning process step, these germanium-containing compounds remained on these surfaces. This redeposition results in contamination in the optical preform and the lowering of manufacturing yields. Thus, this comparative example helped determine the mechanism for the low manufacturing yields.

Comparative Example 2

Etching Step Only

A similar core preform as that produced in Example 3 was made, except that after the centerline etching step the cleaning process step was not performed. The preform was redrawn to approximately 25 mm diameter canes in a redraw furnace with vacuum applied to the centerline in order to close and eliminate the centerline hole. The solid glass canes were examined by microscopy and for refractive index and were found to have some centerline seeds and some redeposited germanium compounds on the centerline. Again, there was no cleaning process used after the etching process. One of the 1 meter canes was then placed back on an OVD lathe and approximately 3200 grams of silica soot having a density of about 0.5 grams/cc was deposited in order to produce an overclad soot preform. This preform was then placed into a quartz-lined consolidation furnace, dried at about 1100° C. in an atmosphere comprising helium and approximately 3 volume % chlorine then sintered to a fully dense preform by lowering it through a hot zone set at approximately 1450-1500° C. The preform was then placed in an argon purged holding oven and held overnight at approximately 1000° C. overnight to outgas dissolved helium. Then the entire preform was drawn to 125 micron diameter optical fiber (>100 km) on an optical fiber draw equipped with an optical detector to determine the presence of airline holes in the fiber. The fiber drawn from this preform was found to have many long airline holes resulting in approximately 15% of the length of the fiber produced from this preform comprising centerline airline holes, thus showing that without the cleaning process step the problems of oxygen seeds and the corresponding airline holes occurred from the centerline contamination in the optical preform and the lowering of manufacturing yields.

Comparative Example 3

Etching Step Only

A similar core preform having a 1% delta (vs. silica), approximately 18% by weight $GeO_2$ and a parabolic shaped profile as that produced in Example 6 was made, except that after the centerline etching step the cleaning process step was not performed. The preform was redrawn to approximately 25 mm diameter canes in a standard redraw furnace with vacuum applied to the centerline in order to close the centerline hole. The solid glass canes were examined by microscopy and for refractive index and were found to have some centerline seeds and some redeposited germanium compounds on the centerline. One of the 1 meter canes was then placed back on an OVD lathe and approximately 5700 grams of silica soot having a density of about 0.5 grams/cc was deposited in order to produce an overclad soot preform. This preform was then placed into a quartz-lined consolidation furnace, dried at about 1100° C. in an atmosphere comprising helium and approximately 3 volume % chlorine then sintered to a fully dense preform by lowering it through a hot zone set at approximately 1450-1500° C. The preform was then placed in an argon purged holding oven overnight to outgas dissolved helium, then the entire preform was drawn to 125 micron diameter optical fiber (>100 km) on an optical fiber draw equipped with an optical detector to determine airline holes in the fiber. The fiber drawn from this preform was found to have many long airline holes resulting in approximately 10% of the length of the fiber produced from this preform comprising centerline airline holes, thus showing that without the cleaning process step the problems of oxygen seeds and the corresponding airline holes occurred from the centerline contamination in the optical preform and the lowering of manufacturing yields.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A process for preparing an optical preform, said method comprising the steps of:
   a) etching an inner portion of an optical preform, said inner portion containing at least 10 wt % $GeO_2$, to remove a portion of an oxide material deposited on the preform by using a gas comprising an etchant gas containing fluorine at a sufficient temperature and gas concentration to create a redeposited Ge compound contamination in the remaining oxide material on an etched portion an optical preform; and
   b) cleaning the etched preform at a temperature between 800° C. and 1600° C. by providing to the etched portion of the preform a cleaning gas containing at least one halogen gas at a sufficient temperature and gas concentration to remove the redeposited Ge compound contamination without any substantial further contamination of the remaining deposited oxide material, wherein the halogen is either chlorine or bromine and does not contain fluorine.

2. The process of claim 1, wherein etchant gas is selected from the group consisting of $CF_4$, $SF_6$, $NF_3$, $C_2F_6$, $C_4F_8$, $CHF_3$, $C_2F_6$, and combinations thereof.

3. The process of claim 1, wherein the cleaning gas containing halogen are is at least one gas selected from the group consisting of: $Br_2$; $Cl_2$; $CH_3Cl$; $CH_2Cl_2$; $CHCl_3$; $CCl_4$; $COCl_2$; and/or a saturated, unsaturated, cyclic or aromatic halohydrocarbon, $C_xH_yHalogen_z$, where halogen is Cl or Br, and x is ≥1, y≥0, and 0, and z>1.

4. The process of claim 1, wherein the etchant gas comprises $SF_6$ and the cleaning gas comprises at least one of: CO and $Cl_2$.

5. The process of claim 1, wherein the etchant gas comprises $SF_6$ and the cleaning gas comprises halogen gas $Cl_2$.

6. The process of claim 1, wherein the redeposited Ge compound contamination is a layer of $GeO_xF_y$ or $GeO_x$, wherein x≥1 and y≥0, and cleaning gas includes oxygen-scavenger gas CO and the halogen gas is $Cl_2$.

7. The process of claim 1, wherein said cleaning step is 1 minute to 120 minutes long.

8. A process for preparing an optical preform, said method comprising the steps of:
   a) etching an inner portion of an optical preform containing Ge said inner portion containing at least 10 wt % $GeO_2$, to remove a portion of an oxide material deposited on the preform by using a gas comprising an etchant gas containing fluorine at a sufficient temperature and gas concentration to create a redeposited Ge compound contamination in the remaining oxide material on an etched portion an optical preform; and
   b) cleaning the etched preform by providing to the etched portion of the preform a cleaning gas containing at least one halogen gas at a sufficient temperature and gas concentration to remove the redeposited Ge compound contamination without any substantial further contamination of the remaining deposited oxide material, wherein the halogen is either chlorine or bromine and does not contain fluorine , wherein said cleaning gas further contains at least one oxygen-scavenger gas.

9. The process of claim 8, wherein the optical preform is partially collapsed prior to etching, the preform having an inner and outer surface and the redeposited Ge compound contamination is on the inner surface.

10. The process of claim 9, wherein the preform is partially collapsed before etching and the inner surface has inner diameter of less than about 10 mm.

11. The process of claim 10, wherein the inner diameter is not larger than 5 mm.

12. The process of claim 10, wherein the temperature during the etching step is greater than 1300° C. and is less than about 1700° C.

13. The process of claim 12 wherein the temperature during the etching step is less than about 1400° C. to 1600° C.

14. The process of claim 12, wherein the cleaning step temperature is between 800° C. and 1600° C.

15. A process for preparing an optical fiber preform comprising the steps of:
   a) etching an inner surface of the optical fiber preform containing at least 10 wt % $GeO_2$ to remove a portion of an oxide material deposited on the preform by using a gas comprising an etchant gas containing fluorine at a sufficient temperature and gas concentration to create a germanium containing compound contamination layer in the remaining oxide material; and
   b) cleaning the etched inner surface of the preform at temperatures between 800° C. and 1600° C. by providing a cleaning gas containing at least one oxygen-scavenger gas and at least one halogen gas to the etched inner surface of the preform without any substantial further contamination of the remaining deposited oxide material.

16. The process of claim 15, wherein the first etchant gas has a flow rate of greater than about 65 sccm and the cleaning gas has a flow rate of at least 25 sccm.

17. The process of claim 16, wherein said etchant gas is selected from the group consisting of $CF_4$, $SF_6$, $NF_3$, $C_2F_6$, $C_4F_8$, $CHF_3$, $C_2F_6$ and combinations thereof; and said cleaning gas is selected from the group consisting of: CO; $CCl_4$; $CH_4$; $C_2H_6$; propane; acetylene; ethylene; $CH_3Cl$; $CH_2Cl_2$; $CHCl_3$; $COCl_2$; $C_xH_yHalogen_z$, where halogen is Cl or Br, and x is >1, y≥0, and y+z=2x+2; $Br_2$; $Cl_2$, and combinations thereof.

18. A process for preparing an optical fiber preform comprising the steps of:
   a) etching an inner portion of an optical fiber perform, said inner portion containing at least 10 wt % $GeO_2$ to remove a portion of an oxide material deposited on the preform by using a gas comprising an etchant gas containing fluorine at a sufficient temperature and gas concentration to create a $GeO_x$ contamination layer in the remaining oxide material; and
   b) cleaning the etched portion of the preform using a cleaning gas, said cleaning gas comprising at least one gas selected from the group consisting of CO; $CCl_4$; $CH_4$; $C_2H_6$; propane; acetylene; ethylene; $CH_3Cl$; $CH_2Cl_2$; $CHCl_3$; $COCl_2$; $C_xH_yHalogen_z$ where halogen is Cl or Br, and x is >1, y≥0, and y+z=2x+2; $Br_2$; and $Cl_2$, at a sufficient temperature and gas concentration to remove the redeposited oxide $GeO_x$ contamination layer without any substantial further contamination of the remaining deposited oxide material.

* * * * *